April 12, 1927.
E. G. CLEVERLY
FIXING FOR RODS, POLES, AND THE LIKE
Filed July 31, 1924
1,624,392
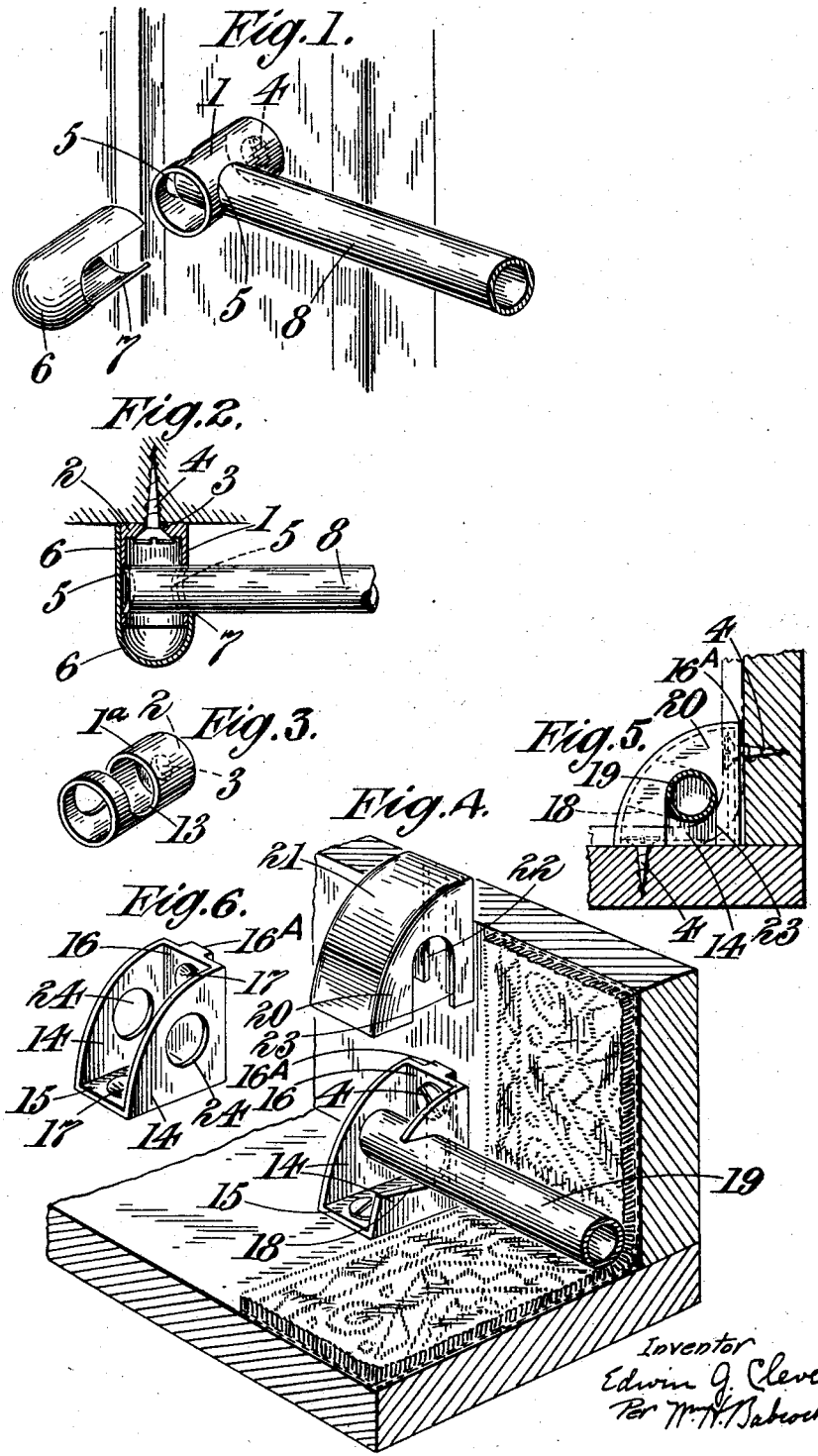
Inventor
Edwin G. Cleverly
Per W. H. Babcock & Son
Attys Patented Apr. 12, 1927.

1,624,392

UNITED STATES PATENT OFFICE.

EDWIN GEORGE CLEVERLY, OF LONDON, ENGLAND.

FIXING FOR RODS, POLES, AND THE LIKE.

Application filed July 31, 1924, Serial No. 729,362, and in Great Britain August 1, 1923.

This invention relates to fixings for curtain rods or poles, stair rods, or similar articles, and is particularly directed to a curtain rod support or bracket which can be easily fitted, which will be cheap, and the appearance of which will be neat and clean, and to a stair rod eye having these qualities also. Both fixings are secure and not liable to release accidentally the rod which they hold. It is a further object to provide devices in which the screws etc. by which the fixing is secured are invisible, and in which the rod or the like may be easily removed and replaced.

According to the present improvements, a fixing to support and hold a rod or the like comprising a base member with means for securing the same in position to the window frame, stair, or other foundation (such means preferably comprising a screw or screws with head inside the member) having a transverse or lateral passage to receive the rod or equivalent, and a removable cap or second member in cooperation with the base member and with a transverse lateral passage or passages for the rod, the cap forming the means of securing the rod in the base member. The lateral passage in the base member is either a slot or slots into which the rod is placed by a sideways movement as will be understood, or a hole or holes through which the rod is inserted by endwise or axial movement. The cap is preferably a sliding fit outside the base member and may retain the rod simply by preventing the movement necessary for removal thereof by abutment, or in a modification by clamping the rod by means of a nut adapted to be screwed into firm contact with it. The latter form may be useful where, although endwise movement is to be prevented, the rod is required to project right through the fitting.

The invention thus briefly summarized will be enlarged upon by the following description with the drawing, in which, Fig. 1 shows a simple form of terminal or end fitting for a curtain rod, the cap removed for illustration.

Fig. 2 is a sectional view thereof.

Fig. 3 shows an alternative design of base member for use as in Fig. 1.

Fig. 4 shows a stair rod fitting or eye, the parts separated.

Fig. 5 is a side elevation of the assembled stair rod eye.

Fig. 6 shows an alternative base to that in Fig. 4.

In the fitting shown in perspective in Fig. 1, a base member comprises a hollow cylindrical portion 1 with an annular flat bottom 2 having a central hole 3 for a securing screw 4 the head of which lies within the member as seen in Fig. 3. The portion 1 has a diametrical passage formed by holes 5 in which lies the rod. The cap member comprises a hollow cylindrical body 6 with (conveniently) a domed head giving a pleasing smooth appearance. The member 6 has a slot 7 in axial direction, adapted to pass a rod 8 which is positioned in a hole or holes 5. The cap 6 slides axially of, and preferably makes a tight frictional fit on the base, and, having only one slot 7, prevents endwise movement of the rod 8 in one direction. The fitting at the other end of the rod of course prevents endwise movement in the opposite direction and so the rod is secured. The whole fitting is conveniently formed by stamping, as are other adaptations of the invention. The part 2 may be advantageously slightly dished so that the screw 4 will draw up tight against its resiliency.

Instead of base member 1, a modified base member 1ª may be used, an example of which is shown in Fig. 3. The difference lies in the provision of a slot 13 instead of holes 5. This slot 13 is transverse to the cylindrical body 1ª and is adapted to accommodate the rod 8, an advantage being that axial or endwise movement of the latter is not necessary in fitting or removing. With a cap in position the rod cannot, of course, accidentally come out of the slot 13.

Although the fittings above described are primarily intended for curtain rods, they are of course applicable for use with stair rods although generally a more robust construction is desirable for the latter application.

A special stair rod eye is shown in Figs. 4 and 5, in which a base member of quarter-cylindrical form is shown, having side plates 14, a tread plate 15, and riser plate 16 each of the latter (or one of them only) having holes 17 for securing screws 4 by which the member is secured to the stair tread and riser. The riser plate 16 has preferably an outstanding rib 16ᴬ which spaces it somewhat from the stair riser surface, facilitating fitting of the cap member. The side plates 14 are segmental in shape and one of them has a slot 18 cut from the periphery towards the riser; that is, the slot is about horizontal although it may advantageously slope downwards and inwards. The stair rod lies through the slot and is prevented from endwise movement by abutment against the other side plate 14, or against the side of the cap. The cap comprises side plates 20 of the same shape as plates 14, formed integrally with a curved wall 21 which gives the complete fitting its segmental appearance. Two flanges 22 are provided down the riser edges of sides 20 which fit between the riser plate 16 and the stair riser, and which retain the cap on the base. The rib 16^A is adapted to lie between flanges 22 and, by spacing the plate 16 from the stair riser, gives room for them.

A side 20 of the cap is slotted vertically at 23 to pass the rod 19, and in position prevents the rod from being accidentally displaced in the slot 18. The passage for the rod may be said to be formed by the overlap of the slots 18—23 and consequently the slots positively prevent lateral displacement of the rod. The cap member may be, in practice, a free fit on the base, its weight sufficing to keep it in position, and this point lends to great ease in removing and replacing the stair rods for cleaning, carpet laying, etc.

To assist standardization in production the base member may have both side plates 14 slotted, the caps being right and left handed and by their unslotted sides preventing endwise movement of the rods. Alternatively two types of base member may be used and a standard cap with two slots provided.

In fitting with this type no endwise moving of the rod is necessary, saving wear of the carpet and difficulties on curved flights of stairs, awkward corners, etc. The construction lends itself to manufacture by casting or possibly stamping, but it is desirable that the two parts should be stiff and robust as considerable stresses arise due to the tension of the carpet, kicking, etc.

An alternative form of base member has no slots 18 but holes 24 (Fig. 8), but this form necessitates endwise movement of the rod in fitting.

For different sectional shapes of rod, the slots and/or holes forming the passages in the various members may be suitably shaped.

In any fitting, a hole or slot may be made slightly large or oval to make fitting easy in spite of slight misalignment.

It will be realized that the shapes and details of the device are unessential features and are subject to various modifications. Also that rods with which the invention may be used may include hanging rods of other kinds than for curtains, or for other purposes than for retaining stair carpets.

I claim:—

1. In a fixture for stair and curtain rods and the like, the combination of a base member having a transverse passage to receive a rod and formed with a perforation extending at right angles to said passage for receiving a securing means whereby said base may be anchored to a support, with a separate cap slidably applied to said base in a direction at right angles to the axis of the rod and having one side wall slotted at an angle to said transverse passage so as to straddle the portion of the rod extending in said base member and having its opposed side wall of unbroken area to prevent the endwise movement of the rod in that direction, said cap overlying said perforation.

2. In a fixture for stair and curtain rods and the like, the combination of a base member having a transverse passage to receive a rod and adapted to be secured to a support, with a separate cap slidably applied to said base in a direction sharply transverse of the axis of the rod and having one wall slotted at an angle to said transverse passage so as to straddle the portion of the rod extending in said base member and having its opposed side wall overlying the end of the rod so as to extend in the path thereof to prevent its endwise movement in that direction.

3. In a fixture for stair and curtain rods and the like, the combination of a base member having a slot extending transversely thereof and axially of the rod to be secured therein, said base member being adapted to be secured to a supporting member, with a separate cap slidably applied to said base member in a direction transverse of the rod and so formed as to prevent substantial movement of said cap in any other direction, one side of said cap being formed with a slot extending at an angle to the slot in said base member to be out of registry therewith and so located as to straddle the portion of the rod extending in the base member, the base member and cap as thus combined presenting at the opposite side of said cap a web extending into the path of the rod to prevent the endwise movement thereof in that direction.

In testimony whereof, I have signed my name to this specification at 18 Cavendish Square, London, this 15th day of July, 1924.

EDWIN GEORGE CLEVERLY.